United States Patent [19]

Beck et al.

[11] Patent Number: 4,907,928
[45] Date of Patent: Mar. 13, 1990

[54] FASTENING MEMBER FOR SECUREMENT INTO HARD MATERIALS

[75] Inventors: Josef Beck, Vaduz; Hans Hachtel, Schaanwald; Alfred Tobler, Aachstr, all of Switzerland

[73] Assignee: Hilti Aktiengesellschaft, Fürstentum, Switzerland

[21] Appl. No.: 270,955

[22] Filed: Nov. 14, 1988

[30] Foreign Application Priority Data

Nov. 12, 1987 [DE] Fed. Rep. of Germany ....... 3738471

[51] Int. Cl.$^4$ ............................................. F16B 19/00
[52] U.S. Cl. ..................................... 411/387; 411/424; 411/441; 411/901
[58] Field of Search ............... 411/386, 387, 402, 439, 411/440, 441, 487, 496, 901, 424

[56] References Cited

U.S. PATENT DOCUMENTS

| | | |
|---|---|---|
| 3,494,018 | 2/1970 | Helderman et al. ............ 411/441 X |
| 3,978,759 | 9/1976 | Bakoledis ............................ 411/441 |
| 4,102,238 | 7/1978 | Thurner .............................. 411/441 |
| 4,257,307 | 3/1981 | Regensburger ..................... 411/387 |
| 4,287,656 | 9/1981 | Gassman et al. ............... 411/440 X |
| 4,386,882 | 6/1983 | Bereiter ............................. 411/387 |
| 4,395,173 | 7/1983 | Sygnator ............................ 411/387 |
| 4,693,653 | 9/1987 | Schubert et al. ............... 411/402 X |
| 4,730,970 | 3/1988 | Hyner et al. ....................... 411/387 |

FOREIGN PATENT DOCUMENTS 1260240 1/1972 United Kingdom ................ 411/402

Primary Examiner—Gary L. Smith
Assistant Examiner—F. Saether
Attorney, Agent, or Firm—Toren, McGeady & Associates

[57] ABSTRACT

A fastening member to be driven into a hard receiving material, such as concrete, masonry, rock and the like, has an axially extending shank with a drilling head at its leading end and a thread adjacent its trailing end for connecting a load to the fastening member. A device is located on the shank for engagement with a tool for driving the fastening member into the receiving material. Initially, the fastening member drills a blind bore into the receiving material and then an explosive powder charge drives the member into its final position.

7 Claims, 1 Drawing Sheet

U.S. Patent  Mar. 13, 1990  4,907,928
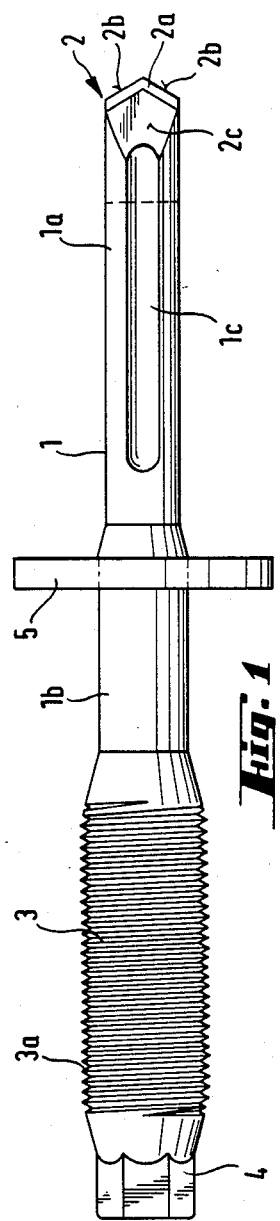
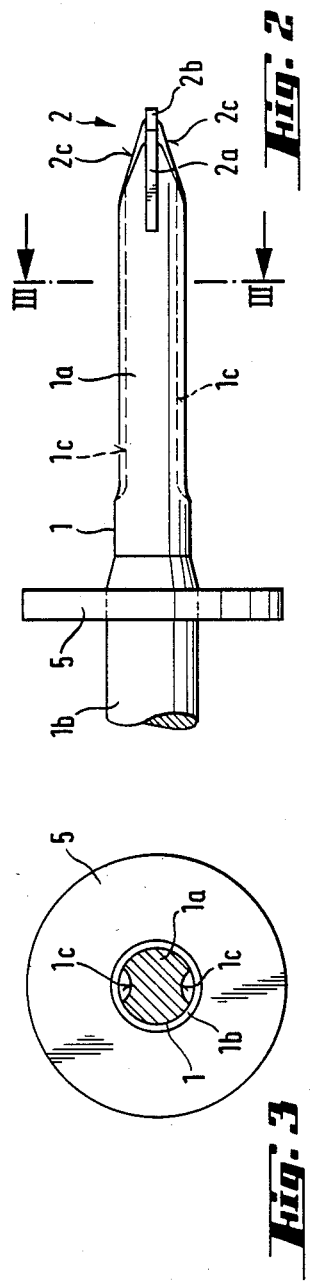
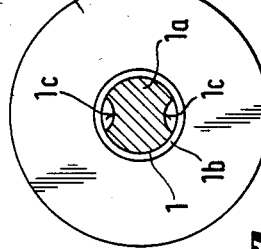
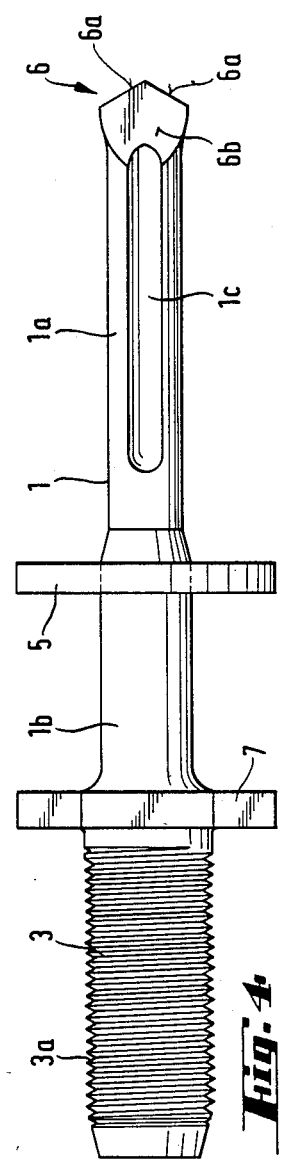

FASTENING MEMBER FOR SECUREMENT INTO HARD MATERIALS

BACKGROUND OF THE INVENTION

The present invention is directed to a fastening member with an axially extending shank that can be driven into hard receiving materials, such as concrete, masonry, rock and the like.

It is known to secure objects to structures formed of hard receiving materials by the use of nail-like fastening members, where the fastening members are driven into the hard receiving material using a setting tool with an explosive powder charge. A considerable advantage of this attached fastening method is the small time required. It is disadvantageous, however, that the fastening members cause high stresses when penetrating into the receiving material in the region of the fastening whereby greater spalling occurs.

To avoid spalling U.S. Pat. No. 4,287,656 discloses a method in which an attachment member is driven by an explosive powder charge into the base of a blind hole formed in the receiving material. Such a method effectively avoids surface stresses in the receiving material. Driving the member according to this method results in a considerable expenditure in time and handling which must be accepted.

SUMMARY OF THE INVENTION

The primary object of the present invention is to provide a fastening member which can be driven into hard receiving materials with a small expenditure of time and handling while at the same time, avoiding spalling of the receiving material.

Accordingly, the present invention affords the combination of the following characteristics:

(a) a drilling head is located at the leading end of the fastening member shank;

(b) means are located on the shank adjacent the trailing end of the fastening member for securing a load to the member, and (c) in the axially extending region of the shank spaced from the leading end, torque engagement means are provided for seating the fastening member into a driving tool.

The drilling head located at the leading end of the shank permits the drilling of a blind borehole in the receiving material by rotating the fastening member. The rotary motion can be imparted to the fastening member through engagement surfaces at the trailing end of the shank with an appropriate driving tool. It is possible that the rotation of the fastening member can be superimposed on a percussive force applied to the member. After drilling a blind borehole corresponding approximately to half of the shank length, the fastening member with the shank including the drilling head can be driven into its final position by an explosive powder charge. Such a placing procedure for the fastening members saves time and handling costs, since the drilling step and the driving step effected by an explosive powder charge take place consecutively. The means for securing a load for an object on the fastening member may be in the form of a head or threaded section projecting outwardly from the receiving material assuring an adequate attachment which is also satisfactory in its visual appearance. The object to be secured may be a metal plate which can be pierced by the drilling head at the outset of the driving step.

The drilling head is an arrowhead-like part with two cutting edge sections tapering inwardly to a tip at the leading end of the shank. The tip is located on the center of the shank and assures concentric rotation during the drilling operation. The angle between the cutting edge sections amounts approximately to 120°. In one embodiment, the outer diameter of the drilling head can project radially beyond the shank adjacent the drilling head with the shank having a smaller diameter.

Advantageously, the cutting edge sections have a greater hardness as compared to the remainder of the drilling head. This feature affords a high drilling advance, particularly in hard receiving materials, and especially where percussive blows are imparted to the fastening member which blows are superimposed on the rotating action, so that there is little if any deformation of the drilling head.

In one preferred arrangement, the cutting edge sections form a part of a hard metal plate inserted into the drilling head. The hard metal plate can be fixed to the shank by soldering.

In another preferred embodiment, the drilling head is formed monolithically with the shank. In this embodiment, the cutting edge sections are hardened. Inductive hardening or impulse hardening of the cutting edge sections has been found to be particularly suitable.

In still another preferred embodiment, the cutting edge sections are coated with a hard material. The hard material can be applied in the form of a hard metal powder mixture, such as tungsten carbide, by flame spraying.

The means for engaging the fastening member in a driving tool for rotating the member can be in the form of an axial extension at the trailing end of the shank. The extension has engagement surfaces extending around its circumferential periphery for effecting positive locking engagement in an entrainment part or chuck of the driving tool for transmitting torque as well as percussive force to the fastening member. Such an extension can be manufactured by cold forming.

In another embodiment of the invention, the means for engagement within a tool are formed as a laterally projecting member extending radially outwardly from the shank beyond the means for securing a load to the shank. The lateral projection is appropriately formed as a disc-shaped member located on the shank spaced from the trailing end. Due to the larger diameter of the disc-shaped projection, the surfaces on its circumferential periphery permit the transmission of larger torque. Further, the projection can also accept percussive blows superimposed on the rotary motion.

In a preferred embodiment, an axially extending region of the shank is provided with a greater diameter than the leading end region and is located between the leading end region and the means for securing a load on the fastening member. This greater diameter shank section is provided with a laterally extending support for contributing to the satisfactory guidance of the fastening member during the driving operation and prevents oblique displacement of the member.

The ratio of diameter of the drilling head to the greater diameter shank section is approximately in the range of 1:1 to 1:1.3. With such a diameter ratio, play-free entry of the larger diameter shank section is assured into the blind borehole formed by the drilling head. In addition, it is assured that the shank is not exposed to excessive stresses in the region in which it is secured into the receiving material, affording adequate engagement within the material.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 1 is an axially extending side view of a fastening member embodying the present invention;

FIG. 2 is a partial view, similar to FIG. 1, with the fastening member rotated through 90°;

FIG. 3 is a cross-sectional view of the fastening member taken along the line III—III in FIG. 2; and FIG. 4 is a view similar to FIG. 1, illustrating an additional embodiment of the fastening element incorporating the present invention.

DETAILED DESCRIPTION OF THE INVENTION

In FIG. 1, a fastening member is illustrated including an axially elongated shank 1 having a leading end at the righthand end and a trailing end at the left-hand end, as viewed in the drawing. At its leading end, the shank 1 has a drilling head 2. Adjacent the trailing end, the shank has means 3 for securing a load or an object to the fastening member. At the trailing end an axially extending extension 4 is provided with surfaces extending around its circumferential periphery for engagement within a tool. The circumferential periphery of the extension 4 has a hexagonal cross-section. Shank 1 has a leading shank region 1a, on which the drilling head 2 is located and an axially extending shank section 1b, with a greater diameter, extending from the trailing end of the shank section 1a toward the trailing end of the fastening member. A disc 5 is frictionally locked on the trailing shank section 1b and projects radially outwardly from the shank section and serves for the guidance of the fastening member in a driving tool.

At the leading end, the drilling head 2 includes a hard metal plate 2a, inserted into the head and secured by soldering. The hard metal plate 2a at its leading end has an arrowhead-like shape forming two cutting edge sections 2b, converging inwardly to a centered tip. The two cutting edge sections slope outwardly from the tip in the direction toward the trailing end. The hardness of the cutting edge sections 2b is greater than the remainder of the drilling head 2. FIG. 2 illustrates the centered arrangement of the hard metal plate 2a in the drilling head 2 and further displays the tapered surfaces of the drilling head extending symmetrically outwardly from the hard metal plate to the outer surface of the shank section 1a. Accordingly, drilling head 2 has two planar surfaces 2c diverging outwardly from the hard metal plate 2a. Adjacent the drilling head 2, leading shank section 1a includes two axially extending evacuation grooves 1c, each with a circular arc-shaped base, note FIG. 3. The diameter of the trailing shank section 1b is approximately 1.2 times the diameter of the drilling head which corresponds to the outer diameter of the leading shank section 1a. The means 3 for securing an object or load to the fastening member is an axially extending external thread 3a, which has a diameter greater than the diameter of the extension 4 and of the trailing shank section 1b.

Another fastening member is shown in FIG. 4 and, for reasons of simplicity, the same reference numerals are used for its parts which coincide with the parts of the fastening member displayed in FIG. 1. As distinguished from the fastening member in FIG. 1, shank 1 has a drilling head 6 formed integrally with the leading shank section 1a. Further, the fastening member in FIG. 4 has a disc-shaped radially extending projection 7 with a polygonally-shaped circumferentially surface for affording torque engagement with a driving tool for rotating the fastening member. The projection 7 is located between the larger diameter shank section 1b and the threaded section 3 for securing an object on the fastening member. The projection 7 is used in place of the projection 4, shown in FIG. 1. Drilling head 6 has cutting edge sections 6a converging radially inwardly to a centered tip so that the drilling head has an arrowhead-like shape. Flat surfaces 6b taper outwardly and rearwardly from the cutting edge section 6a to the outside surface of the leading shank section 1a. Cutting edge sections 6a are hardened as compared to the other parts of the drilling head by applying a coating of a hard material. The diameter of the drilling head 6 projects radially outwardly beyond the diameter of the adjacent leading shank section 1a, and coincides with the diameter of the trailing shank section 1b.

While specific embodiments of the invention have been shown and described in detail to illustrate the application of the inventive principles, it will be understood that the invention may be embodied otherwise without departing from such principles.

We claim:

1. Fastening member to be driven into a hard receiving drill such as concrete, masonry, rock and the like, and having an axially extending shank with a leading end extending first into the receiving material and an opposite trailing end comprising: a drill head at the leading end of said shank, means for securing a load to said shank located adjacent the trailing end of said shank, means on said shank spaced from the leading end thereof for engagement with a tool for rotating the fastening member, means on said shank located between the leading and trailing ends thereof for guiding said fastening member in a driving tool powered by an explosive powder charge, said shank has a first axially extending cylindrically shaped shank section extending from said drilling head toward said trailing end, a second axially extending cylindrically shaped shank section extending from said first shank section toward said trailing end, said second shank section having a greater diameter than said first shank section and, a third shank section including said means for securing a load, said third shank section located between said second shank section and said trailing end, said drilling head has an arrowhead-like cutting edge formed of two diametrically oppositely extending cutting edge sections sloping radially outwardly from a centered tip in the direction toward the trailing end of said shank, said means for engagement with a tool comprises a polygonally shaped projection located on said shank between said second shank section and the trailing end thereof, said projection being polygonally shaped transverse to the axial direction of said shank, and said means for guiding said fastening member comprises a disk frictionally locked on said second shank section and projecting radially outwardly from said second shank section, said disk being displaceable on said second shank section toward said trailing end when said fastening member is driven by an explosive powder charge, and means on said first shank section for evacuating material drilled by said drilling head.

2. Fastening member, as set forth in claim 1, wherein said drilling head comprises a hard metal plate inserted into and secured to said drilling head with said hard metal plate forming said cutting edge sections.

3. Fastening member, as set forth in claim 1, wherein said cutting edge sections are hardened relative to the remainder of said drilling head.

4. Fastening member, as set forth in claim 1, wherein said cutting edge sections are coated with a hard material.

5. Fastening member, as set forth in claim 1, wherein said means for engagement with a tool comprises a disc-like projection extending radially outwardly beyond said means for securing a load and located between said means for securing a load and the leading end of said shank.

6. Fastening member, as set forth in claim 1, wherein said drilling head is formed integrally with said shank and said drilling head has a larger diameter than an adjoining section of said shank.

7. Fastening member, as set forth in claim 1, wherein the ratio of the diameter of said drilling head to the diameter of said second shank section is in the range of 1:1 to 1:1.3.

* * * * *